UNITED STATES PATENT OFFICE.

ARNOLD CORTI, OF DÜBENDORF, NEAR ZURICH, SWITZERLAND.

PROCESS FOR DESTROYING LARVÆ AND PUPÆ OF INSECTS.

1,120,136. Specification of Letters Patent. Patented Dec. 8, 1914.

No Drawing. Application filed February 27, 1913. Serial No. 750,993.

*To all whom it may concern:*

Be it known that I, ARNOLD CORTI, doctor of philosophy, and a citizen of the Swiss Republic, and resident of Dübendorf, near Zurich, Switzerland, with the post-office address "Zur Gerbe," have invented new and useful Improvements in the Process for Destroying Larvæ and Pupæ of Insects, of which the following is a specification.

Two principal methods have been proposed for destroying the larvæ and pupæ of injurious insects, such as *Culex, Anopheles, Stegomyia*, etc., in stagnant water, such as ponds or pools or the like. The first of these methods consists in adding to the water, substances which are soluble therein and which are poisonous to said larvæ and pupæ, while the second of said methods consists in applying to the surface of said water, a layer of liquid which is lighter than water, and which is not soluble therein, or miscible therewith. According to the first of said methods, the larvæ and pupæ are directly destroyed, while in the second method the larvæ and pupæ are prevented from coming to the surface of the water for breathing from time to time, since said layer of material would destroy the larvæ and pupæ, whenever they come into direct contact therewith. In the first of these methods, disinfecting substances, such as phenols, cresols and certain anilin dyestuffs have been employed. These materials are open to the objection that they act as poisons to fauna and flora of the water, also these bodies are generally too expensive for general application, moreover they also kill the fish, and also render the water poisonous for larger animals such as birds, cattle and the like, as well as spoiling the water for drinking and household purposes. Such materials as dyestuffs, such as malachite green, strongly color the water. Of the substances which have been proposed for covering the surface of the water a protecting layer to prevent the larvæ and pupæ from breathing, petroleum hydrocarbons such as crude petroleum, also a material called "saprol" (which is composed principally of a mixture of petroleum hydrocarbons with phenol or cresol) have been suggested. These are found to be open to the objections that they possess disagreeable odors, and that they are injurious to the plants standing above the water, particularly rice when growing in marshes, also they are readily evaporated, and the protecting layer is often broken by water plants, especially if the wind is blowing, and are broken or carried away during rain storms and the like. "Saprol" also has been found objectionable since the phenols and cresols dissolve in the water, which injures the water for the reasons above referred to. I have now found that these objectionable features can be overcome, by the use of the materials described herein, which are mixed with the water itself. The materials which I employ, in the proportions in which they are applied do not injure the water for drinking purposes, and do not injure the fish or the vegetation. I have found that the hydrocarbons of the benzene series, brought into a solution, suspension or emulsion, with such bodies as salts of fatty acids (soaps or soapy products) or sulfonated fatty acids, especially Turkey-red oil, effect the desired object when mixed with the water. Instead of hydrocarbons of the benzene series, I may employ (although less advantageously) hydrocarbons of the fatty series, or better still, chlorinated hydrocarbons of the fatty series, particularly trichlorethylene, which material could not be employed according to the processes heretofore proposed.

As examples of substances of the benzene series, xylene has been found to be especially suitable, although benzene, toluene or other homologues thereof may also be employed. Xylene has been found to be suitable, particularly in connection with Turkey-red oil. A solution of xylene in Turkey-red oil even when diluted to the proportion of about 1:20,000, is sufficiently strong for destroying the larvæ or pupæ within a very short time. The readiness with which the xylene can be made to mingle with the water, will depend more or less upon the proportions of xylene and Turkey-red oil employed. With a commercial Turkey-red oil containing about 55% of sulforicinoleic acid an equal amount of xylene may be employed, that is to say 50% of the Turkey-red oil to 50% of the xylene, although a mixture containing 30 to 40% of xylene and 60 to 70% of Turkey-red oil has been found to be very suitable. The water so treated, is colorless and is non-poisonous to man, animals and plants, thereby possessing material advantages over water when treated with anilin dyestuffs, phenol, cresol, and "saprol."

Instead of employing Turkey-red oil I may employ soaps, particularly soft soap, with good results.

The material can readily be brought into a state of suspension or emulsion with the entire bulk of water, and no separation of the material from the water can be observed. A very small amount of the material is capable of destroying the larvæ and pupæ in a large amount of water.

Now what I claim and desire to secure by Letters Patent is the following:

1. A process of destroying larvæ and pupæ of injurious insects in water, which process consists in coating the surface of the water with a mixture of xylene with Turkey-red oil, substantially as described.

2. A process of destroying larvæ and pupæ contained in water, which comprises incorporating with said water a mixture of xylene and Turkey-red oil.

3. A process of destroying larvæ and pupæ contained in water, which comprises incorporating with said water a mixture of xylene and Turkey-red oil, in substantially equal proportions.

In testimony, that I claim the foregoing as my invention, I have signed my name in presence of two witnesses, this 15th day of February 1913.

Dr. ARNOLD CORTI.

Witnesses:
 CARL WEIKE,
 HERMANN WEIL.